US006725383B2

(12) United States Patent
Kyle

(10) Patent No.: US 6,725,383 B2
(45) Date of Patent: Apr. 20, 2004

(54) DATA AND IMAGE CAPTURE, COMPRESSION AND VERIFICATION SYSTEM

(75) Inventor: Wayne Kyle, Gauteng (ZA)

(73) Assignee: BioCom, LLC, Houston, TX (US)

( * ) Notice: Subject to any disclaimer, the term of this patent is extended or adjusted under 35 U.S.C. 154(b) by 0 days.

(21) Appl. No.: 10/437,331

(22) Filed: May 13, 2003

(65) Prior Publication Data

US 2003/0217294 A1 Nov. 20, 2003

Related U.S. Application Data

(60) Provisional application No. 60/380,600, filed on May 15, 2002.

(51) Int. Cl.[7] .................................................. G06F 1/24
(52) U.S. Cl. ...................... 713/202; 713/182; 713/183; 713/186; 713/189; 713/200; 713/201
(58) Field of Search ................................ 713/202, 182, 713/183, 186, 189, 200, 201

(56) References Cited

U.S. PATENT DOCUMENTS

| 5,071,168 A | 12/1991 | Shamos ........................ 283/117 |
| 5,144,680 A | 9/1992 | Kobayashi et al. ............. 382/4 |
| 5,193,855 A | 3/1993 | Shamos ........................ 283/117 |
| 5,259,025 A | 11/1993 | Monroe et al. ................ 380/23 |
| 5,321,751 A | 6/1994 | Ray et al. ..................... 380/23 |
| 5,505,494 A | 4/1996 | Belluci et al. ................. 283/75 |
| 5,606,365 A | 2/1997 | Maurinus et al. ............. 348/222 |
| 5,777,571 A | 7/1998 | Chuang ........................ 341/176 |
| 6,111,517 A | 8/2000 | Atick et al. ............. 340/825.34 |
| 6,137,895 A | 10/2000 | Al-Sheikh ..................... 382/115 |
| 6,213,393 B1 | 4/2001 | Streicher et al. ............. 235/381 |
| 6,301,565 B1 | 10/2001 | Goodwin, III ................ 705/23 |

*Primary Examiner*—Thomas R. Peeso
(74) *Attorney, Agent, or Firm*—Elizabeth R. Hall

(57) ABSTRACT

The present invention includes a communication control device that connects directly to at least one camera. Either analogue or digital cameras are connected to the communication control device. The communication control device captures, compresses, digitizes and/or encrypts the photographic images communicated to the communication control device from each camera and then communicates the processed or compressed images through a TCP/IP or other network protocol to a computer for further processing. The device can further bi-directionally communicate common protocols such as RS232 or RS485 protocols over new or existing computer networks using a TCP/IP or other network protocol. This allows for data input devices such as keyboards, magnetic stripe card readers, proximity readers, barcode scanners, document scanners or similar devices to be interfaced directly into the communication control device. The communication control device can also communicate such protocols to visual output devices such as LCDs to provide interactive feedback on the status or outcome of the verification to the user of the verification system.

18 Claims, 5 Drawing Sheets

DATA AND IMAGE CAPTURE, COMPRESSION AND VERIFICATION SYSTEM

CROSS REFERENCE TO RELATED APPLICATIONS

This application claims priority to pending U.S. patent application Ser. No. 60/380,600 (Attorney Docket Number BICM-P001V), filed May 15, 2002 by inventor Wayne Kyle and entitled "Data and Image Capture, Compression and Verification System."

BACKGROUND OF THE INVENTION

1. Field of the Invention

The present invention relates generally to image capture and processing, and more particularly, to a method and device used to capture, compress and digitize photographic images and further to convert common protocols so that they may be bi-directionally communicated over computer networks via TCP/IP protocol and other similar protocols.

2. Description of the Related Art

Existing biometric architectures utilize a process computer or similar device for capturing images from a camera. As illustrated in FIG. 1, the computer 12 captures the images from either an analogue or digital camera 14 (NTSC/PAL) via installed capture cards, USB, Firewire and/or other proprietary capture mechanisms. Once captured, the system relies on the compression software that resides on the computer 12 to compress and digitize the images so that they can be "fed" into the software systems for recognition and verification. For example, face recognition systems use various algorithms for face recognition comparison, face finding, and template creation and matching.

These existing systems require a local computer 12 interfaced with each camera 14 to capture, compress or digitize photographic images for face or other biometric recognition systems. Interactive feedback is provided via the existing computer's monitor 11. Data input devices 13 such as keyboards, magnetic swipe readers, proximity readers, barcode scanners, document scanners or similar devices are also interfaced directly into the local computer 12 via communication ports.

There exists a need to consolidate this process so that photographic images from multiple cameras can be captured, compressed and digitized by a non-computer based device that will in turn communicate with a single central processing unit that will in turn utilize those images for the purposes of face recognition.

There exists a further need for such a device to provide interactive feedback via a visual mechanism such as a Liquid Crystal Display ("LCD") without the need for this feedback to be provided through the local computer 12. The device should also provide for conversion and bi-directional communication of common protocols over a new or existing computer network, such as an Ethernet network.

SUMMARY OF THE INVENTION

The present invention includes a communication control device that connects directly to at least one camera. Either analogue or digital cameras are connected to the communication control device. The communication control device captures, compresses, digitizes and/or encrypts the photographic images communicated to the communication control device from each camera and then communicates the processed or compressed images through a standard network protocol, including without limitation, a TCP/IP, HTTP, UDP, or ARP protocol to a computer for further processing.

The device can further bi-directionally communicate common protocols such as RS232 or RS485 protocols over new or existing computer networks using a standard network protocol, including without limitation a TCP/IP, HTTP, UDP or ARP protocol. This allows for data input devices such as keyboards, magnetic stripe card readers, proximity readers, barcode scanners, document scanners or similar devices to be interfaced directly into the communication control device. The communication control device can also communicate such protocols to visual output devices such as LCDs to provide interactive feedback on the status or outcome of the verification to the user of the verification system and/or to the person being identified.

One aspect of the present invention is an identity verification system, the verification system comprising: (a) entry means for recording biometric data; (b) a data input device; (c) display means for displaying information to a user; (d) a communication control device remote from said entry means, data input device and display means, said communication control device having receiving means for receiving the biometric data from the entry means and a set of input data from the data input device, first conversion means for selectably capturing a portion of the biometric data received from the entry means and converting said portion of captured biometric data into a compressed digital file of the captured biometric data, second conversion means for formatting the set of input data into a network protocol standard, transmitting means for transmitting data from the communication control device to the display means, and connecting means for connecting the first conversion means to the entry means, the second conversion means to the data input device, the transmitting means to the display means, and the communication control device to a computer network; (e) a central processing unit remote from the communication control device and in communication with the communication control device having an installed biometric recognition system, storage means for storing a set of digital biometric templates in a biometric database, searching means for searching the biometric database for a stored biometric template linked with an identifying parameter, first processor means for generating a test biometric template from the captured biometric data using the installed biometric recognition system, second processor means for comparing the test biometric template with the stored biometric template to provide a validation signal when a correspondence between the test biometric template and the stored biometric template is detected; and (g) a computer network connecting the communication control device to the central processing unit.

Another aspect of the present invention is a communication control device for capturing biometric data for identity verification, said device consisting essentially of: (a) receiving means for receiving a set of biometric data from a biometric data entry device and a set of input data from a data input device, (b) first conversion means for selectably capturing a portion of the set of biometric data received from the biometric data entry device and converting said portion of captured biometric data into a compressed digital file of the captured biometric data, (c) second conversion means for formatting the set of input data from the data input device into a network protocol standard, (d) transmitting means for transmitting data from the communication control device to a visual output device, and (e) connecting means for connecting the first conversion means to the biometric data entry device, the second conversion means to the data input device, the transmitting means to the visual output device, and the communication control device to a computer network.

Yet another aspect of the present invention is a communication control device for capturing biometric data for identity verification, said device consisting essentially of: (a) a camera server having a video engine in communication with at least one camera, wherein the video engine selectably captures a set of photographic images taken with the camera and converts the images into a compressed digital file, a first data conversion engine in communication with at least one data input device, wherein the first data conversion engine captures a set of input data from the data input device and formats the captured data into a network protocol standard, and a second data conversion engine, wherein the second data conversion engine formats a set of output data for communication with a visual output device; and (b) a main board that connects the camera server to the camera, the data input device, the visual output device and a computer network.

A further aspect of the present invention is a method for image capture and verification comprising the steps of: sending a live video stream of an individual taken with a camera to a communication control device; capturing a photographic frame out of the video stream; converting the photograph frame into a compressed digital file; capturing a set of input data in a common protocol format from at least one data input device; converting the common protocol formatted data into a network standard protocol; sending the compressed digital file and converted input data to a central processing unit for image verification or identification; and providing feedback on the status or outcome of the verification to a visual output device.

Still yet another aspect of the present invention is a face recognition based method for verifying the identity of an individual, the method comprising the steps of: entering an identifier associated with the individual through a referenced data input device into a communication control device, said communication control device in communication with a CPU; searching an enrolled face database residing on the CPU for the individual's identifier, wherein said enrolled face database links a stored digitized facial template file previously obtained from the individual with the individual's identifier; activating a camera reference-linked to the referenced data input device; gathering a plurality of photographic images of the individual; capturing a set of selected photographic images with the communication control device and generating a compressed digitized image file from the selected photographic images; transmitting the compressed digitized image file to the CPU; processing the compressed digitized image file though a face recognition system residing on the CPU to form a test facial template file; comparing the test facial template file with the previously stored facial template file using the face recognition system; and providing feedback on the correspondence of the test facial template file with the previously stored facial template file associated with the identifier to a visual output device associated with the biometric data entry mechanism.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The present invention relates generally to image capture and processing, and more particularly, to a method and device used to capture, compress and digitize photographic images and further to convert and bi-directionally communicate common protocols over a network via TCP/IP protocols or other similar network protocols.

Figure 1:
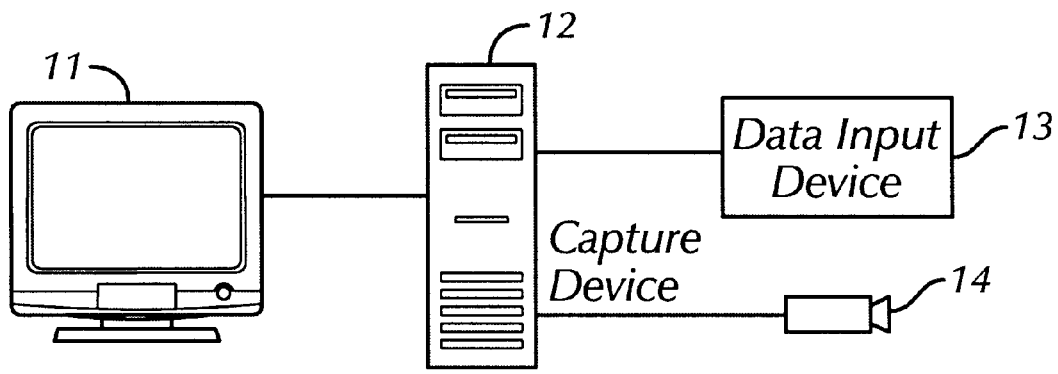
FIG. 1 is a schematic representation of prior art image capture and data input processes.
Figure 2:
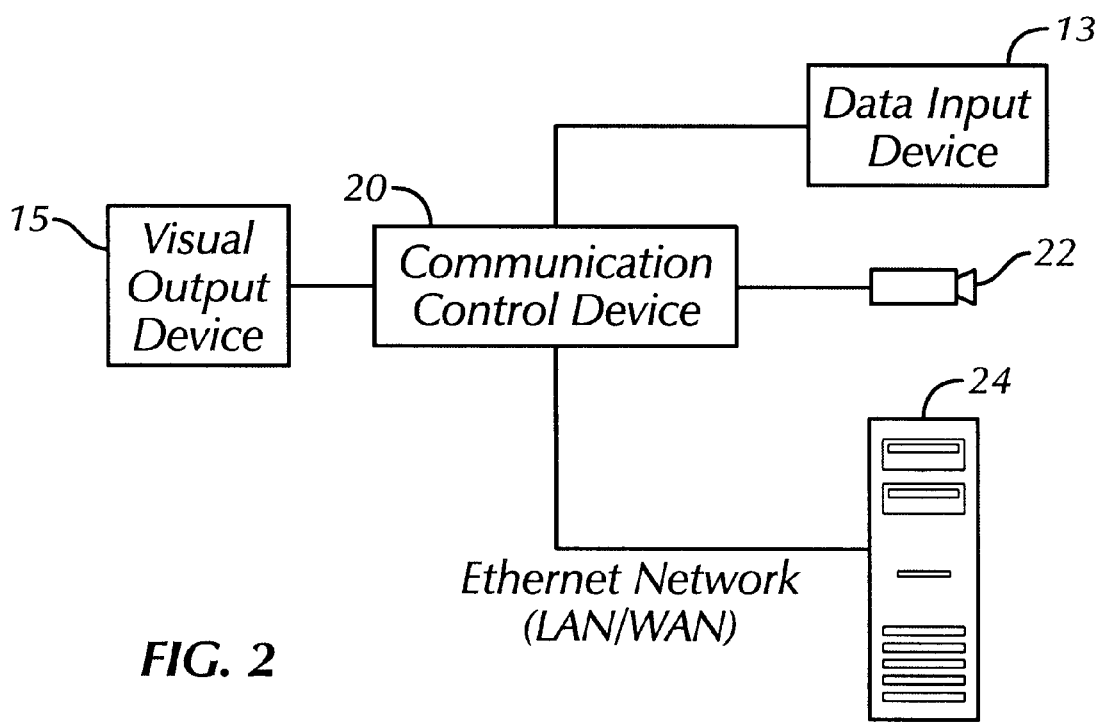
FIG. 2 is a schematic depiction of a camera, data input device and visual output device directly connected to the communication control device of the present invention, where the communication control device is connected to a central processing unit.

The present invention utilizes a communication control device 20. The communication control device 20 captures and processes photographic images or other data and converts such data into a common format that can be communicated via TCP/IP protocols or other similar network protocols over a computer network. As shown in FIG. 2, the communication control device 20 is directly connected to at least one camera 22. The communication control device 20 can communicate with either an analogue or a digital camera. The communication control device 20 captures, compresses and/or digitizes the photographic images communicated to the communication control device 20 from each camera 22, as well as converts common protocols from data input devices 13 to a standard network protocol, such as a TCP/IP, HTTP, UDP or ARP or other similar network protocol. The communication control device 20 also communicates the processed or compressed images and common protocol data through a TCP/IP protocol or some other similar network protocol to a central processing unit ("CPU") 24 for further processing. Once the photographic images have been processed, analyzed and compared to information on secured databases by the CPU 24 the will the results of the comparison will be displayed on the visual output device 15.

Figure 3:
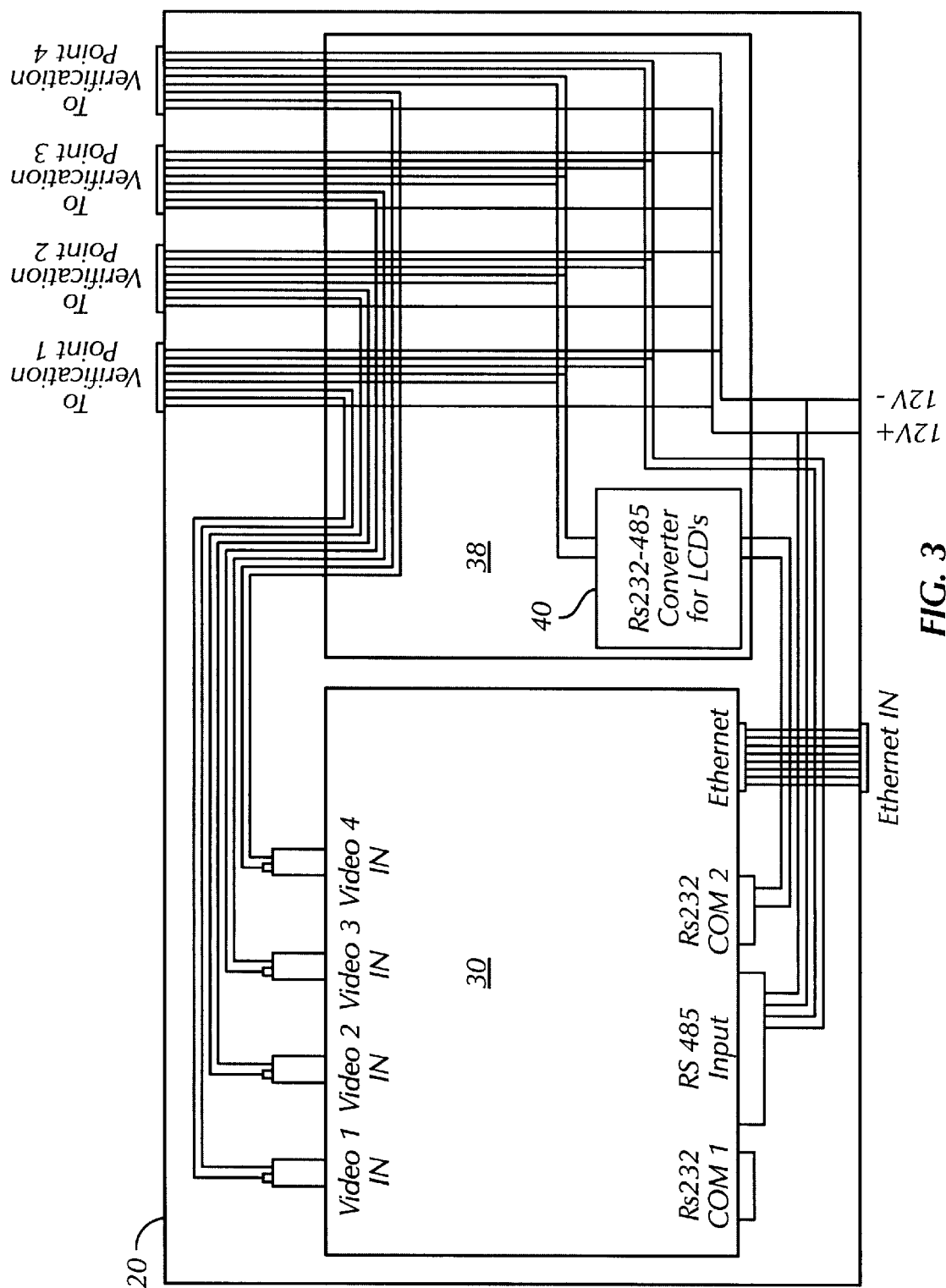
FIG. 3 is a schematic depiction of the communication control device of the present invention.

The communication control device 20, shown in FIG. 3, comprises an Ethernet camera or video server device 30, such as is commercially available from Axis Communications of Sweden, and an interconnecting main board 38, as is commercially available from BioCom, LLC of Houston, Tex. The video server device comprises four composite video inputs, two RS232 input connectors and one RS485 input connector.

The interconnecting main board 38 within the communication control device 20 is used to connect external data input devices 13 and visual output devices 15, as well as cameras 22 to the camera server device 30 residing within communication control device 20. The main board 38 has connectors that connect to external cameras 22, visual output devices 15 (such as LCDs) and external data input devices 13 (such as a passport or document scanners, card swipe units, proximity sensors, or barcode scanners). The main board 38 also has connectors that connect the camera server device 30 to either a new or existing Ethernet based network, such as a TCP/IP based network. Furthermore, the main board 38 has circuitry that converts the RS485 data from the visual output device 15 to RS232 data. This is performed in the example shown because the internally mounted camera server device 30, shown in FIG. 3, is only capable of handling one stream of RS 485 data and this stream is used for the data input devices 13. The visual output devices 15 (LCDs) also use a RS485 protocol and must be converted to an RS232 protocol so that it can be connected to the RS232 input port on the internal camera server 30. The RS232-485 converter 40 on the main board 38 performs this conversion function.

The camera server device 30 utilized in the present invention is similar to a device within currently available integrated network cameras. Such integrated network cameras are used to stream live video and/or static images to internet browsers or dedicated applications. In contrast, the present invention separates the camera 22 from the camera server device 30, such that it can be used with one or more cameras 22. Thus, if the camera 22 has a problem, only the camera 22 must be replaced since the camera server device 30 is not integrated into the camera 22.

The camera server device 30 can also be used to bi-directionally communicate common protocols such as RS232 or RS485 protocols over a new or existing computer network using a standard network protocol, including but not limited to a TCP/IP, HTTP, UDP or ARP protocol. This allows for data input devices such as magnetic stripe card readers, proximity readers, barcode scanners, document scanners or similar devices to be interfaced directly into the device. The device can also communicate such protocols to visual output devices 15 such as LCDs (Liquid Crystal Displays) to provide interactive feedback on the status and/or outcome of the verification to the user and/or individual who is verifying.

The communication control device 20 is connected to any standard camera 22, whether it is an analogue camera or a digital camera, any data input device 13 or visual output device 15 using a common protocol such as RS232 or RS485. Commercially available camera server devices 30 (such as one sold by Axis Corporation of Lund, Sweden) are used in the present invention in cooperation with hardware that performs connecting functions and protocol conversion functions, as well as power distribution functions.

Figure 4:
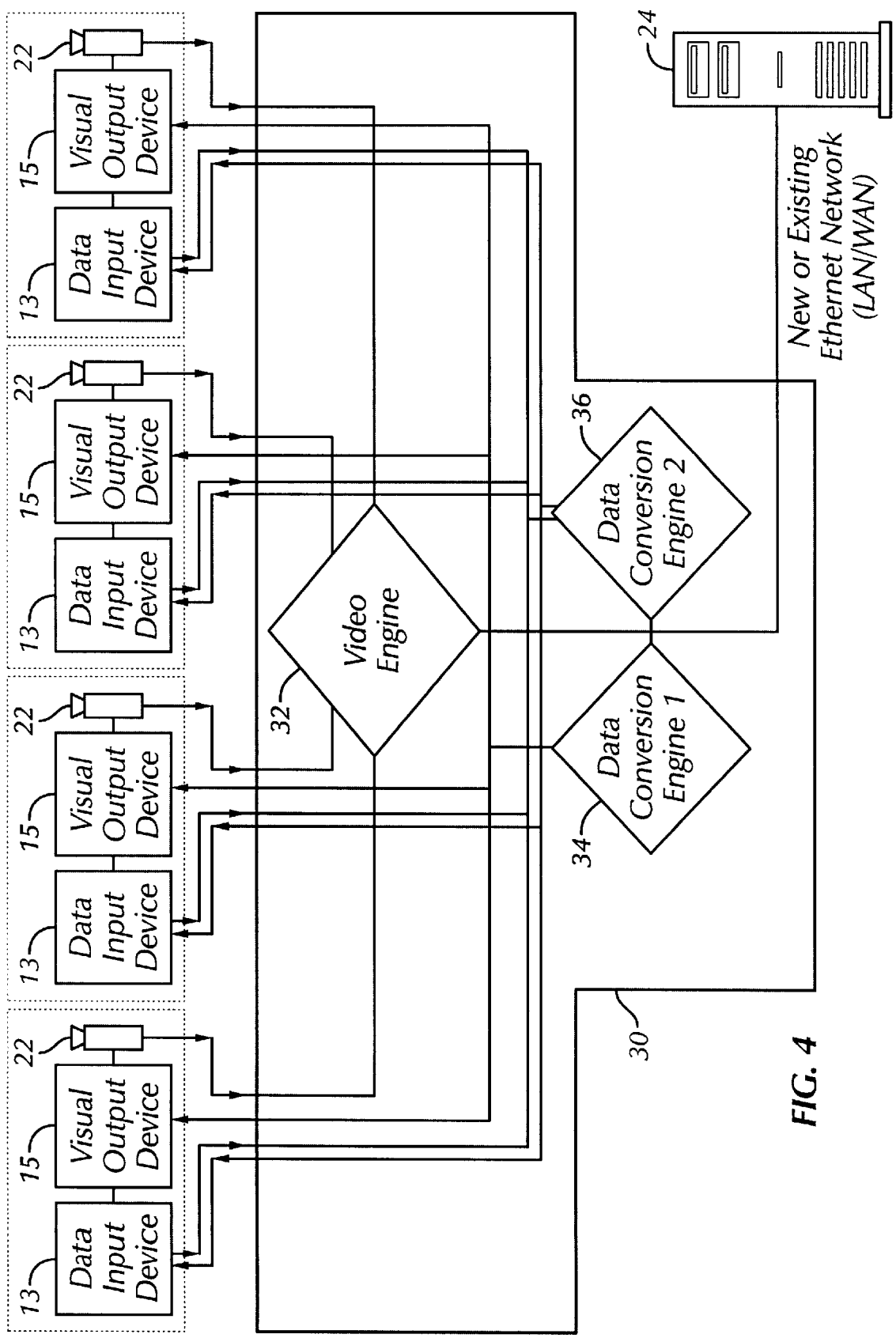
FIG. 4 is a schematic depiction of the camera server device and its connection to the cameras, the data capture devices, the visual output devices and the Ethernet network.

FIG. 4 illustrates how the camera server device 30 interfaces into the analogue or digital cameras 22, data input devices 13 and visual output devices 15. Three main engines/functions handle incoming and outgoing video and data feeds. The video engine 32 performs the image capture, compression and/or digitization of the images from the live video feed. The data protocol conversion engines 34 and 36 perform the conversions of the common protocols to a standard network protocol such as a TCP/IP, HTTP, UDP or ARP protocol. For example in FIG. 4, the first data conversion engine 34 handles the protocol conversions associated with the visual output devices 15 and the second data conversion engine 36 handles the protocol conversions associated with the data input devices 13. FIG. 4 further illustrates how the camera server device 30 is interfaced to the CPU 24 via a new or existing Ethernet network.

Figure 5:
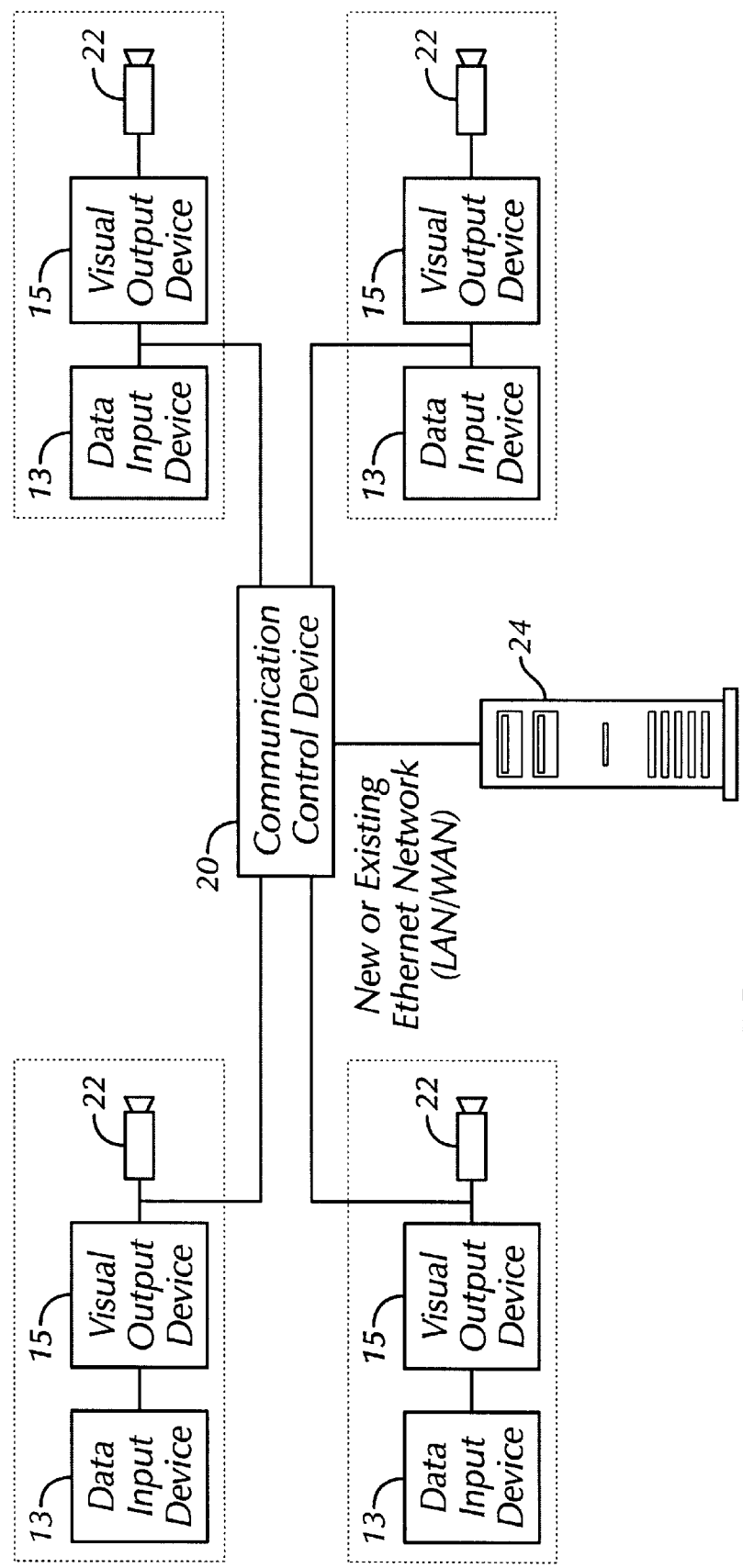
FIG. 5 is a schematic depiction of a plurality of cameras, data input devices and visual output devices connected to the communication control device that is connected to a processing computer.

As shown in FIG. 5, the Verification/Identification System of the present invention involves at least one and preferably up to four cameras 22 connected to a single communication control device 20. The images from each camera 22 and the data from the data input devices 13 at each verification station are fed into the communication control device 20 with a reference link that identifies the camera sending the image and the data entered at the linked data input device 13. Preferably, the camera server device 30 converts the photographic images to JPEG, MPEG, Bitmap, Wavelet or similar image formatted files and sends those files over a TCP/IP protocol network, or some other similar protocol based network, to the CPU 24 along with the location reference and any relevant input data from the reference-linked data input devices 13 to facilitate the reference lookup on a database. After having performed the reference lookup on the database (using the input data), the CPU 24 then applies the face recognition system to each image. The results of applying the face recognition system to each image are relayed to the user via the visual output device 15 that is connected to the communication control device 20.

It should be noted that the analogue or digital cameras 22, the data input devices 13 and the visual output devices 15 may be interconnected prior to being connected to the communication control device 20. This facilitates the connection of the various devices at the verification station with the communication control device 20, often only requiring a single cable for the hook-up to the communication control device 20 to a computer network.

The communication control device 20 may or may not reside in close proximity to the CPU 24, the distance between the communication control device 20 and the CPU 24 only being limited by the architecture of the communication network between the communication control device 20 and the CPU 24. The communication control device 20 communicates with the CPU 24 over any standard accepted computer network (LAN or WAN) medium (copper cable, fiber optic cable, laser, radio frequency, and the like). The CPU 24 processes the images received from the communication control device 20 using a process for biometric recognition comparison, finding and/or template creation/matching. The biometric recognition system discussed herein is a face recognition system, such as the face recognition algorithm of Visionics Corporation, Jersey City, N.J. (as described in U.S. Pat. No. 6,111,517). However, other biometric recognition systems such as fingerprint-, hand-, iris- or other biometric-based systems may be used.

Figure 6:
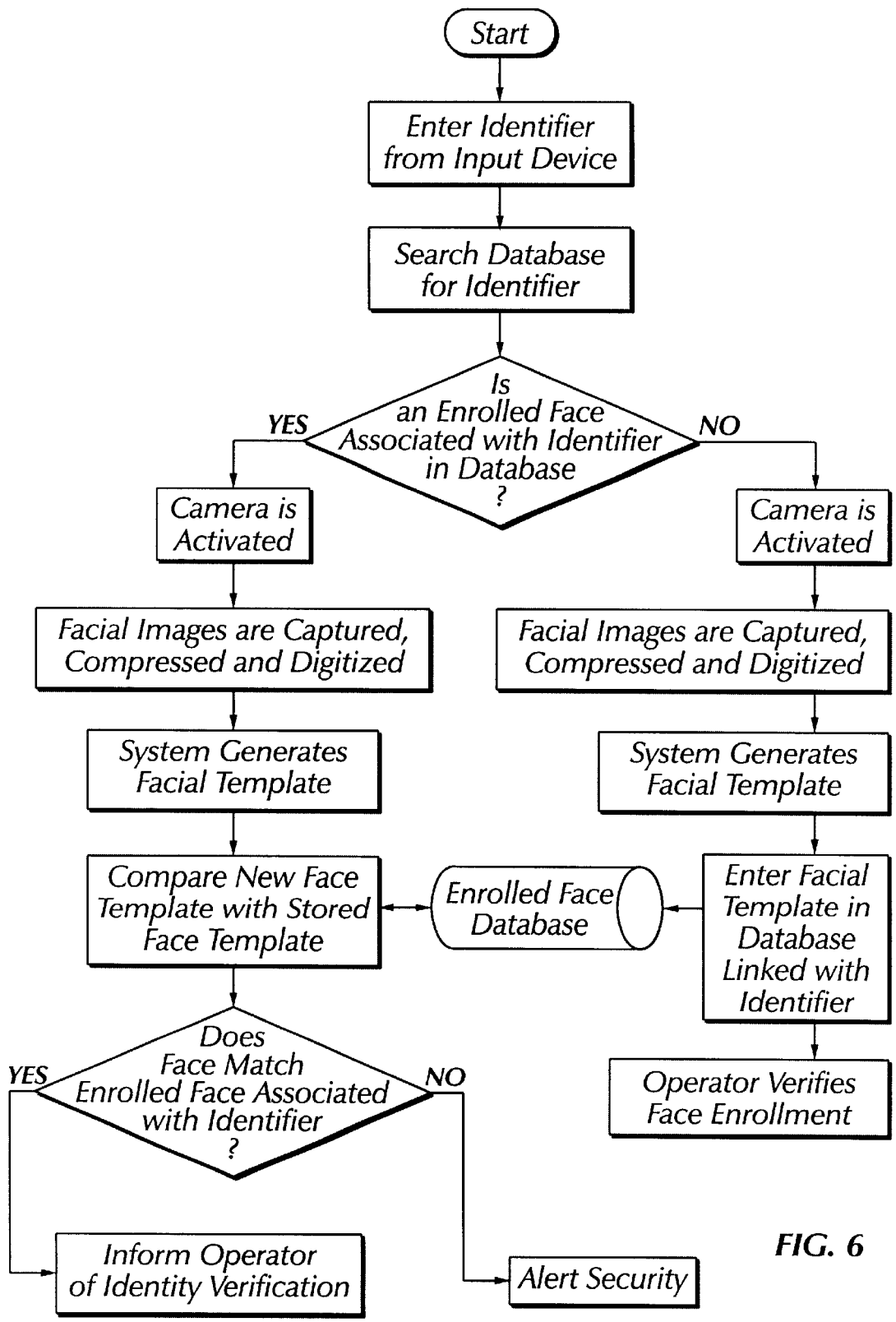
FIG. 6 is a flowchart of the verification process of the present invention.

The overall Verification/Identification System is shown in FIG. 6. First an identifier (including without limitation as a passport number, bank account number, credit card number, driver's license number or social security number) is entered at a referenced data input device 13. An enrolled face database residing on a CPU 24 is queried to determine if a face has been enrolled in the database that is associated with the identifier.

If an enrolled face is associated with the identifier in the database, the system will activate the camera or notify the user to activate the camera 22 reference-linked to the data input device 13 where the identifier was entered. The system will gather the requisite number of images of the individual and stream the images to the communication control device 30 where the images are captured, compressed and digitized. The compressed digitized images are then sent to the CPU 24. The CPU 24 processes the images through a face recognition algorithm to create facial templates to compare with the enrolled facial templates associated with the identifier in the database. The results from the comparison of the generated facial templates with the facial templates stored in the database (i.e., if the image has been verified, identified, or stored) are sent to the visual output device 15 at the verification station. If the facial templates do not match the enrolled face associated with the identifier, the incident will be stored and filed for audit purposes later, the transaction will be denied and security may be notified. If the facial templates do match the enrolled face associated with the identifier, the person's identify is verified and the person is allowed to complete the desired transaction.

If on the other hand there is no enrolled face associated with the identifier in the database, the system will activate the camera and the system will enroll the person into the database. The system captures the requested images of the person and sends the images to the communication control device 30. The communication control device 30 captures, compresses and digitizes the images and sends the compressed digitized images to the CPU 24 to be processed. The CPU 24 will process the images through the face recognition algorithm to create facial templates. The facial templates will then be stored in the database associated with the identifier for future reference. Finally, the system tests the enrolled facial templates by performing the verification process. Thus, the system will capture a second set of images, process the images and compare the facial templates with the facial templates of that person that were just entered into the system. If the face recognition system matches the facial templates, the person is enrolled in the database. If, on the other hand, the face recognition system does not match the facial templates, the user must repeat the enrollment process.

The present invention uses an image and data capture, compression and verification system referred to as the Verification/Identification System that allows the integration of images and data from multiple verification stations through the communication control device 20 to be analyzed by a face recognition system on a single CPU 24. The verification station is defined herein as the point where the actual physical transaction takes place and where the input data is entered and the images to be processed by the face recognition system for comparison, recognition or verification are gathered.

Existing architectures utilize and install the face recognition system on a local computer at each verification station. The cameras at the verification station are connected to the local computer via a capture card, USB port or other proprietary capture mechanism. Once an image has been captured through this mechanism, the local computer 12 compresses and digitizes the image. The compressed and digitized image is then processed for verification or identification of the image. This methodology requires the algorithm and software of the face recognition system to reside on the local computer 12 at the verification station.

In contrast, the present invention uses a "one to many" approach to the architecture design of the Verification/Identification systems. The cameras and associated data gathering devices mounted at the verification stations are connected to a communication control device that processes and digitizes photographic images before feeding them to the CPU 24 where the actual processing occurs pertaining to the face recognition system. No processing pertaining to the face recognition system occurs on the computer at or near the verification station where the input data is entered and the images to be used for the face recognition system are gathered. Thus, the algorithms and software of the face recognition system do not reside on the local computer located at the verification stations. Instead, the algorithm and software used for the face recognition system reside on the processing CPU 24.

This methodology enables a single installation/incidence of the algorithm that is used for the face recognition system to service multiple verification stations. The number of verification stations that can be serviced by a single installation of the algorithm that is used for the face recognition system can vary tremendously depending on the hardware used and its configuration as well as on the volume of transactions requested.

This Verification/Identification System provides at least the following advantages over existing systems: (1) standard analogue or digital cameras are used in the system; (2) multiple cameras can be connected to the communication control device, eliminating the use of a separate CPU at each verification station for image compression and digitization; (3) the algorithms and software of the face recognition system are not loaded on the local CPU used at the verification station, thereby eliminating concern regarding the interface of various software and graphic programs on the local CPU; (4) the application of the face recognition system is typically physically separated from the verification station making it less subject to subterfuge by a local user of the Verification/Identification System; (5) the required hardware for the Verification/Identification System is less than for existing systems with a corresponding decrease in capital investment and maintenance expenses; (6) the number of algorithm licenses required is dramatically reduced since only one incidence/installation of the algorithm residing on the processing CPU 24 is required to service multiple verification stations, where the reduction in the number of algorithm licenses required is directly related to the cost of the system on a per-verification station basis; and (7) common protocol data input devices 13 and visual output devices 15 can be connected to the system through the communication control device 20 and communicated over a new or existing computer network architecture, such that in the case of existing Ethernet networks this methodology vastly reduces the amount of cabling required to connect the verification or identification points to the central CPU 24.

While the foregoing description includes detail which will enable those skilled in the art to practice the invention it should be recognized that the description is illustrative in nature and that the invention is not limited in its application to the details of construction and the arrangement of components set forth in the description or illustrated in the drawings. The invention is capable of many modifications and variations that will be apparent to those skilled in the art having the benefit of these teachings. Also, it is to be understood that the phraseology and terminology employed herein is for the purposes of description and should not be regarded as limiting.

What is claimed is:

1. An identity verification system, the verification system comprising:
   (a) entry means for receiving biometric data;
   (b) a data input device;
   (c) display means for displaying information to a user;
   (d) a communication control device remote from said entry means, data input device and display means, said communication control device having
      (i) receiving means for receiving a set of biometric data from the entry means and a set of input data from the data input device,
      (ii) a first conversion means for selectably capturing a portion of the set of biometric data received from the entry means and converting said portion of captured biometric data into a compressed digital file of the captured biometric data,
      (iii) a second conversion means for formatting the set of input data into a network protocol standard,
      (iv) transmitting means for transmitting data from the communication control device to the display means, and
      (v) connecting means for connecting the first conversion means to the entry means, the second conversion means to the data input device, the transmitting means to the display means, and the communication control device to a computer network;
   (e) at least one central processing unit remote from the communication control device and in direct communication with the communication control device having
      (i) an installed biometric recognition system,
      (ii) storage means for storing a set of digital biometric templates in a biometric database,
      (iii) searching means for searching the biometric database for a stored biometric template linked with an identifying parameter,
      (iv) first processor means for generating a test biometric template from the captured biometric data using the installed biometric recognition system,
      (v) second processor means for comparing the test biometric template with the stored biometric template using the installed biometric recognition to provide a validation signal when a correspondence between the test biometric template and the stored biometric template is detected.

2. The identity verification system of claim 1, wherein the entry means is a camera.

3. The identity verification system of claim 2 having a plurality of cameras.

4. The identity verification system of claim 1, wherein the data input device is a digital reading device that reads and transmits digital data recorded on a personal identification mechanism.

5. The identity verification system of claim 4, wherein the personal identification mechanism is a passport, a driver's license, a national identification document, a credit card, a bankcard, or an authorized employee card.

6. The identity verification system of claim 1 having a plurality of data input devices.

7. The identity verification system of claim 1, wherein the display means is a liquid crystal display.

8. The identity verification system of claim 2, wherein the first conversion means converts the portion of captured biometric data into a set of JPEG, MPEG, Bitmap or Wavelet image formatted files.

9. The identity verification system of claim 1, wherein the network protocol standard is a TCP/IP, HTTP, UDP or ARP protocol standard.

10. The identity verification system of claim 1, wherein the installed biometric recognition system is a face recognition system.

11. A communication control device for capturing biometric data for identity verification, said device consisting essentially of:
    (a) receiving means for receiving a set of biometric data from a biometric data entry device and a set of input data from a data input device,
    (b) a first conversion means for selectably capturing a portion of the set of biometric data received from the biometric data entry device and converting said portion of captured biometric data into a compressed digital file of the captured biometric data,
    (c) a second conversion means for formatting the set of input data from the data input device into a network protocol standard,
    (d) transmitting means for transmitting data from the communication control device to a visual output device, and
    (e) connecting means for connecting the first conversion means to the biometric data entry device, the second conversion means to the data input device, the transmitting means to the visual output device, and the communication control device to a computer network.

12. The communication control device of claim 11, wherein the biometric data entry device is a camera.

13. A communication control device for capturing biometric data for identity verification, said device consisting essentially of:
    (a) a camera server having
       a video engine in communication with at least one camera, wherein the video engine selectably captures a set of photographic images taken with the camera and converts the images into a compressed digital file, a first data conversion engine in communication with at least one data input device, wherein the first data conversion engine captures a set of input data from the data input device and formats the captured data into a network protocol standard, and a second data conversion engine, wherein the second data conversion engine formats a set of output data for communication with a visual output device; and (b) a main board that connects the camera server to the camera, the data input device, the visual output device and a computer network.

14. The communication control device of claim 13, wherein each camera in communication with the video engine has an identification code, said identification code linked to the compressed digital file of images originating from the camera.

15. The communication control device of claim 14, wherein the set of input data is linked to the digital file of images.

16. A method for image capture and verification comprising:

sending a live video stream of an individual taken with a camera to a communication control device;

capturing at least one photographic frame out of the video stream;

converting the photographic frame into a compressed digital file;

capturing a set of input data in a common protocol format from at least one data input device;

converting the common protocol formatted data into a network standard protocol;

sending the compressed digital file and converted input data to a central processing unit for image verification or identification; and providing feedback on the status of the verification process to a visual output device.

17. A face recognition based method for verifying the identity of an individual, the method comprising the steps of:

entering an identifier associated with an individual through a referenced data input device into a communication control device, said communication control device in communication with a CPU;

searching an enrolled face database residing on the CPU for the identifier, wherein said enrolled face database links a set of previously obtained and stored digitized facial template files with the previously obtained and stored personal identifiers of various persons;

activating a camera reference-linked to the referenced data input device;

gathering a plurality of photographic images of the individual;

capturing a set of selected photographic images with the communication control device and generating a compressed digitized image file from the selected photographic images;

transmitting the compressed digitized image file to the CPU;

processing the compressed digitized image file though a face recognition system residing on the CPU to form a test facial template file;

comparing the test facial template file with a specific stored facial template file linked to the individual's identifier in the enrolled face database; and providing feedback on the correspondence of the test facial template file with the previously stored facial template file linked to the individual's identifier to a visual output device associated with the biometric data entry mechanism.

18. The method of claim 17, further comprising the step of alerting security if the test facial template file and the previously stored facial template linked to the individual's identifier do not correspond.

* * * * *